(12) United States Patent
Wang et al.

(10) Patent No.: US 11,903,014 B2
(45) Date of Patent: Feb. 13, 2024

(54) TRANSMISSION PRIORITIZATION BETWEEN UPLINK AND SIDELINK

(71) Applicant: MediaTek Singapore Pte. Ltd., Singapore (SG)

(72) Inventors: Xuelong Wang, Beijing (CN); Tao Chen, Beijing (CN); Zhixun Tang, Beijing (CN)

(*) Notice: Subject to any disclaimer, the term of this patent is extended or adjusted under 35 U.S.C. 154(b) by 510 days.

(21) Appl. No.: 17/125,306

(22) Filed: Dec. 17, 2020

(65) Prior Publication Data

US 2021/0195610 A1    Jun. 24, 2021

Related U.S. Application Data

(63) Continuation of application No. PCT/CN2019/126164, filed on Dec. 18, 2019.

(51) Int. Cl.
*H04W 72/56* (2023.01)
*H04W 76/10* (2018.01)
*H04L 5/00* (2006.01)
*H04L 1/1812* (2023.01)
*H04W 72/20* (2023.01)

(52) U.S. Cl.
CPC .......... *H04W 72/56* (2023.01); *H04L 1/1812* (2013.01); *H04L 5/0055* (2013.01); *H04W 72/20* (2023.01); *H04W 76/10* (2018.02)

(58) Field of Classification Search
CPC ..... H04W 72/56; H04W 72/20; H04W 76/10; H04W 72/569; H04W 76/15; H04W 76/23; H04W 76/14; H04W 72/23; H04L 1/1812; H04L 5/0055; H04L 1/1854; H04L 1/0028; H04L 1/1607
See application file for complete search history.

(56) References Cited

U.S. PATENT DOCUMENTS

| 2020/0205165 | A1* | 6/2020 | Huang | H04L 1/1854 |
| 2021/0105126 | A1* | 4/2021 | Yi | H04L 1/1671 |
| 2021/0136781 | A1* | 5/2021 | Hosseini | H04W 72/23 |
| 2022/0272721 | A1* | 8/2022 | Lee | H04W 72/569 |
| 2022/0312387 | A1* | 9/2022 | Ye | H04W 72/0453 |

* cited by examiner

*Primary Examiner* — Hanh N Nguyen
(74) *Attorney, Agent, or Firm* — Helen Mao; Zheng Jin; Imperium Patent Works (57) ABSTRACT

Apparatus and methods are provided for transmission prioritization between uplink and sidelink. In one novel aspect, transmission prioritization is performed between uplink data transmission and sidelink physical channel/signal transmissions, including feedback channel (PSFCH). In one embodiment, PSFCH transmission is prioritized over the UL transmission when the highest logic channel priority value of the UL transmission with available data is larger than a configured UL priority threshold. In another embodiment, the transmission of the PSFCH is prioritized over the transmission of the UL channel when the transmission of the PSFCH is prioritized over the transmission of the UL channel when a highest logic channel priority value of the UL transmission with available data is larger than a configured UL priority threshold and a highest logic channel priority value of the SL transmission for the transceiving SL channel is lower than a configured SL priority threshold; otherwise, the UL transmission is prioritized.

9 Claims, 6 Drawing Sheets

TRANSMISSION PRIORITIZATION BETWEEN UPLINK AND SIDELINK

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2019/126164, titled "Methods and Apparatus of Transmission Prioritization between Uplink and Sidelink," with an international filing date of Dec. 18, 2019. This application claims priority under 35 U.S.C. § 119 from Chinese Application Number CN 202011467276.2, titled "TRANSMISSION PRIORITIZATION BETWEEN UPLINK AND SIDELINK" filed on Dec. 14, 2020. The disclosure of each of the foregoing documents is incorporated herein by reference.

TECHNICAL FIELD

The disclosed embodiments relate generally to wireless communication, and, more particularly, to transmission prioritization between uplink and sidelink.

BACKGROUND 5G radio access technology will be a key component of the modern access network. It will address high traffic growth and increasing demand for high-bandwidth connectivity. In 3GPP New Radio (NR) vehicle to everything (V2X) supports uplink (UL) and sidelink (SL) transmission prioritization. The QoS requirement of both SL and UL transmissions can be used to judge whether the SL transmission is to be prioritized over UL. The transmission prioritization between UL and SL for NR V2X applies when UL transmission (TX) overlaps in time domain with SL TX in the shared/same carrier frequency. The data transmission priority between UL and SL are based on logic channel (LCH) priorities. For some SL channels, however, such as the physical sidelink feedback channel (PSFCH) and broadcast channel (BCH), there is no logic channel priority assigned.

Improvements and enhancements are required for transmission prioritization between uplink and sidelink, especially for physical layer common control channel, such as SL-PSFCH and SL-BCH.

SUMMARY

Apparatus and methods are provided for transmission prioritization between uplink and sidelink. In one novel aspect, the transmitting UE performs transmission prioritization between uplink data transmission and sidelink feedback channel (PSFCH) transmission and/or the other physical channel/signal transmission, such as the SL-BCH and synchronization signal. In one embodiment, the UE establishes an SL connection in a wireless network, wherein the UE is served by an access link with a base station in the wireless network, performs an SL transceiving over a transceiving SL channel, wherein a physical sidelink feedback channel (PSFCH) of the sidelink HARQ feedback of the transceiving SL channel, and performs a prioritization between a transmission of the sidelink PSFCH and an uplink (UL) transmission of an UL channel over the access link when the transmission of the sidelink PSFCH overlaps in time domain with the transmission of the UL channel in a shared carrier frequency. In one embodiment, the transceiving SL channel is an SL data channel or an SL control channel. In another embodiment, the PSFCH transmission is prioritized over the UL transmission when a highest logic channel priority value of the UL transmission with available data is larger than a configured UL priority threshold; otherwise, the UL transmission is prioritized. In yet another embodiment, the transmission of the PSFCH is an ACK/NACK or ACK based SL transmission, and wherein the transmission of the PSFCH is prioritized over the transmission of the UL channel when a highest logic channel priority value of the UL transmission with available data is larger than a highest logic channel priority value of the UL transmission with available data is larger than a configured UL priority threshold and a highest logic channel priority value of the SL transmission for the transceiving SL channel is lower than a configured SL priority threshold; otherwise, the UL transmission is prioritized.

In one embodiment, the transmission prioritization between the UL transmission and SL common control channel transmission is performed. The UE establishes an SL connection in a wireless network, wherein the UE is served by an access link with a base station in the wireless network, performs an SL transceiving over a transceiving SL channel, and performs a prioritization between a SL transmission over the SL and an uplink (UL) transmission of an UL channel over the access link when the SL transmission overlaps in time domain with the UL transmission in a shared carrier frequency. In one embodiment, the SL transmission is for an SL common control channel. In one embodiment, the SL common control channel transmission is prioritized over the UL transmission. In another embodiment, the UL transmission is prioritized over the SL common control channel transmission when the UL transmission is one of transmissions comprising a MSG1 transmission, a MSG3 for random access channel (RACH) procedure, and a physical uplink shared channel (PUSCH) for emergency packet data unit (PDU) connection; otherwise, the SL common control channel transmission is prioritized over the UL transmission. In one embodiment, the SL common control channel is a sidelink broadcast channel (BCH) or a sidelink synchronization channel. In one embodiment, the SL transmission is for a physical sidelink feedback channel (PSFCH). The SL PSFCH transmission is prioritized over the UL transmission. In one embodiment, the UL transmission is for a physical uplink control channel (PUCCH), and wherein the UL transmission is prioritized over the SL transmission. In another embodiment, the UL transmission is prioritized over the SL transmission when the SL transmission is for an SL common control channel.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
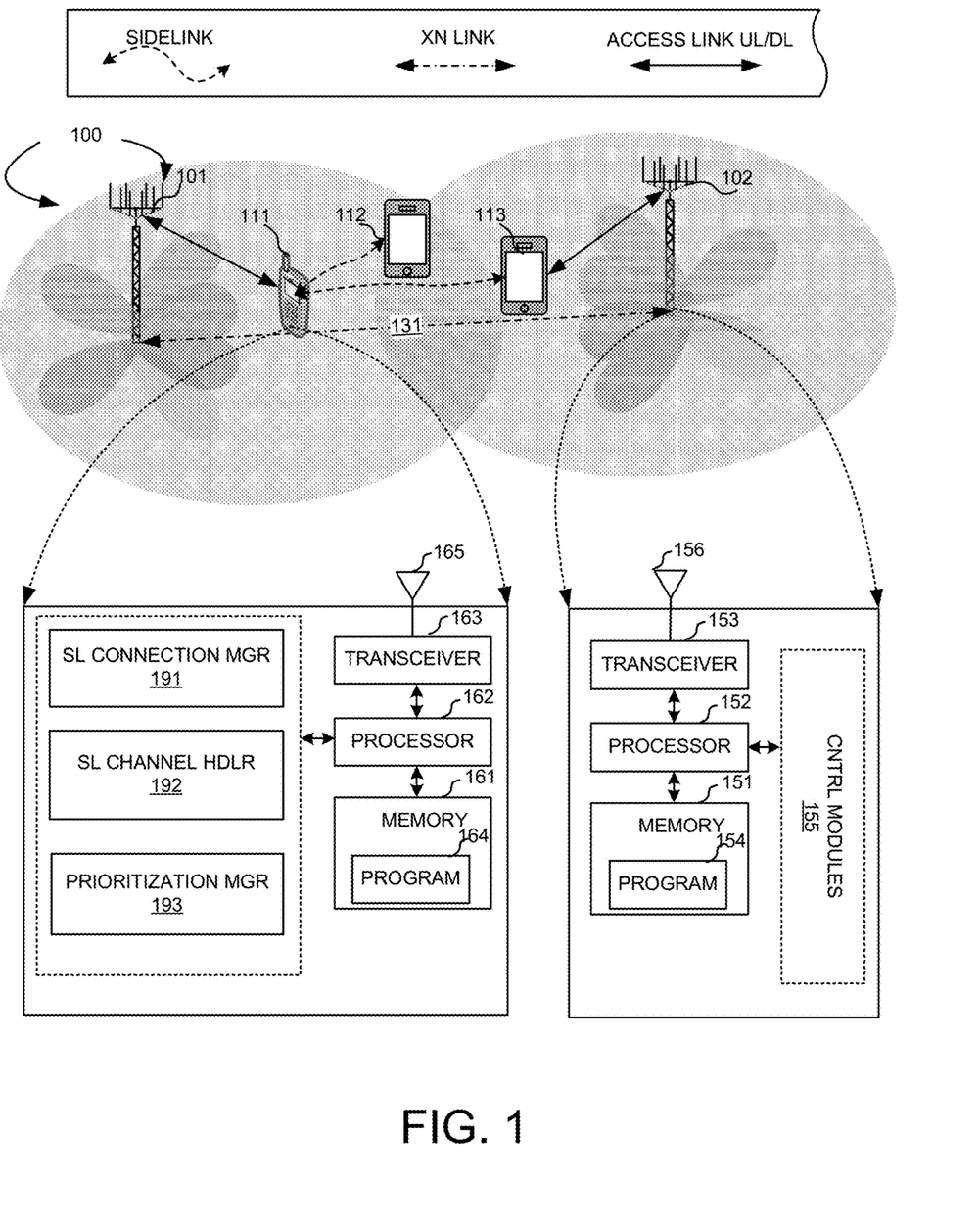
FIG. 1 is a schematic system diagram illustrating an exemplary wireless network for transmission prioritization between uplink and sidelink in accordance with embodiments of the current invention.

FIG. 1 is a schematic system diagram illustrating an exemplary wireless network for transmission prioritization between uplink and sidelink in accordance with embodiments of the current invention. Wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be a homogeneous network or heterogeneous network, which can be deployed with the same frequency or different frequency. gNB 101 and gNB 102 are base stations in the NR network, the serving area of which may or may not overlap with each other. Backhaul connection, such as 131 connects the non-co-located receiving base units, such as gNB 101 and gNB 102. These backhaul connections can be either ideal or non-ideal. gNB 101 is connected with gNB 102 via Xnr interface 131.

Wireless network 100 also includes multiple communication devices or mobile stations, such as user equipments (UEs) 111, 112, and 113. The exemplary mobile devices in wireless network 100 have sidelink capabilities. The mobile devices can establish one or more connections with one or more base stations, such as gNB 101 and gNB 102. The mobile device may also be out of connection with the base stations with its access links but can transmit and receive data packets with another one or more other mobile stations or with one or more base stations through sidelink connections.

In one novel aspect, UL and SL transmission are prioritized when UL transmission overlaps in time domain with SL transmission in the shared/same carrier frequency. UE 111 is served by access link 111 with gNB 101. UE 111 also establishes sidelink with UE 112. When the uplink transmission of UE 111 and the sidelink transmission of UE 111 overlaps in time domain and share the same carrier frequency, prioritization between the UL and SL transmission are performed. When the UL transmission or the SL transmission is data or control transmissions, the transmission is prioritized based on the logic channel priority value assigned to the UL channel and SL channel. The higher the value of the logic channel priority value is, the lower transmission priority it is assigned. For SL physical layer common control channels, such as SL-PSFCH and SL-BCH, the prioritization is based on the UL priority setting and/or the SL data channel priority setting. In other scenarios, UE 113 has an access link connection with UL and downlink (DL) connections with gNB 102 as well as a sidelink connection with UE 111. Prioritization for different channel types, including data channel, control channel, and common control channel, for the UL and SL transmission are provided.

FIG. 1 further illustrates simplified block diagrams of a base station and a mobile device/UE for data/control transmissions. gNB 102 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 103. Memory 151 stores program instructions and data 154 to control the operations of gNB 102. gNB 102 also includes a set of control modules 155 that carry out functional tasks to communicate with mobile stations.

UE 111 has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving, which is different from the HF transceiver. RF transceiver 163 also converts received baseband signals from processor 162, converts them to RF signals, and sends out to antenna 165. Processor 162 processes the received baseband signals and invokes different functional modules to perform features in the UE 111. Memory 161 stores program instructions and data 164 to control the operations of the UE 111. Antenna 165 sends uplink transmission and receives downlink transmissions to/from antenna 156 of gNB 102.

The UE 111 also includes a set of control modules that carry out functional tasks. These control modules can be implemented by circuits, software, firmware, or a combination of them. A sidelink connection manager 191 establishes an SL connection in the wireless network, wherein the UE is served by an access link with a base station in the wireless network. An SL channel handler 192 that performs an SL transceiving over a transceiving SL channel, wherein a physical sidelink feedback channel (PSFCH) of the sidelink carries sidelink hybrid automatically repeat request (HARQ) feedback of the transceiving SL channel. A prioritization manager 193 performs a prioritization between an SL transmission of an SL channel over the SL and an uplink (UL) transmission of an UL channel over the access link when the SL transmission overlaps in time domain with the UL transmission in a shared carrier frequency.

Figure 2:
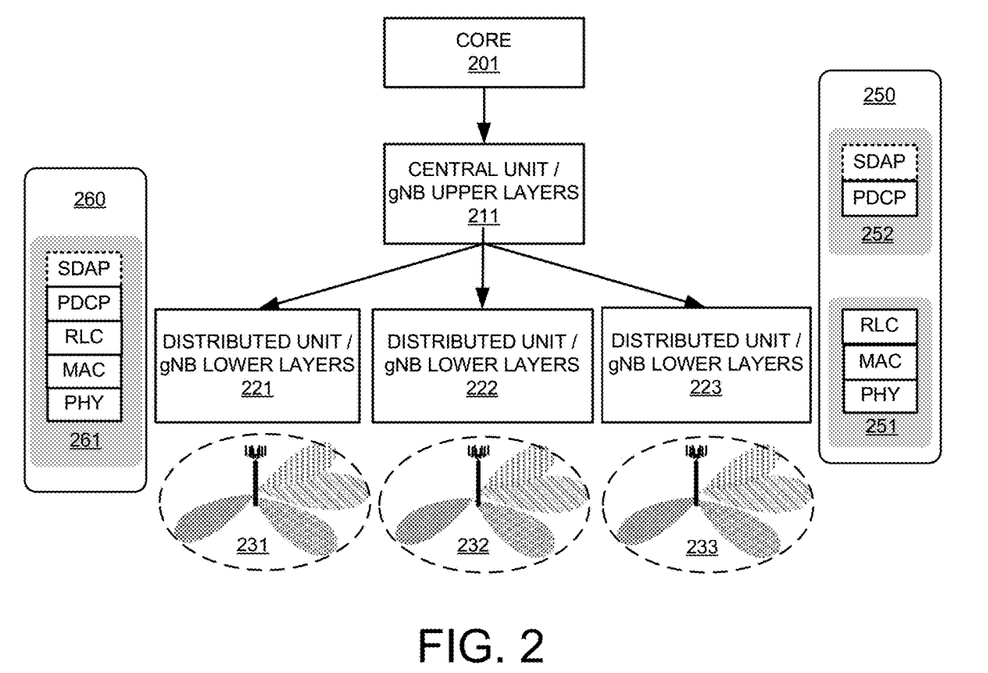
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A Core unit 201 is connected with one central unit 211 with gNB upper layer 252. In one embodiment 250, gNB upper layer 252 includes the PDCP layer and optionally the SDAP layer. Central unit 211 is connected with distributed units 221, 222, and 221. Distributed units 221, 222, and 223 each corresponds to a cell 231, 232, and 233, respectively. The DUs, such as 221, 222 and 223 include gNB lower layers 251. In one embodiment, gNB lower layers 251 include the PHY, MAC and the RLC layers. In another embodiment 260, each gNB has the protocol stacks 261, including SDAP, PDCP, RLC, MAC and PHY layers.

Figure 3:
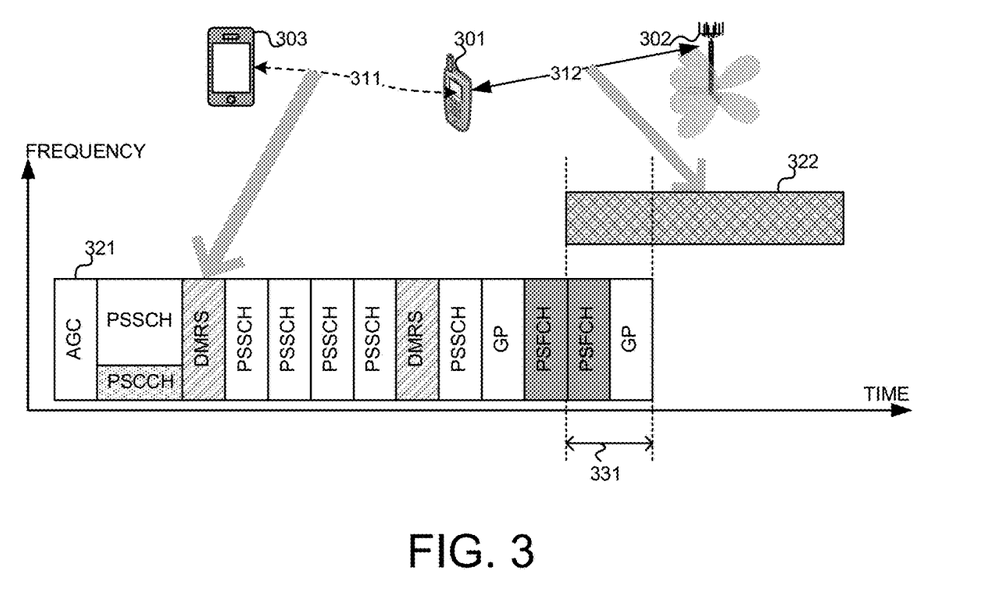
FIG. 3 illustrates exemplary diagrams of uplink and sidelink transmission prioritization when the collision happens between the UL and the SL transmission in the NR network with V2X connections in accordance with embodiments of the current invention.

FIG. 3 illustrates exemplary diagrams of uplink and sidelink transmission prioritization when the collision happens between the UL and the SL transmission in the NR network with V2X connections in accordance with embodiments of the current invention. Two UEs 301 and 303 are V2X UEs. There is an NR Uu air interface between gNB 302 and UE 301 through access link 312, including both uplink and downlink. Optionally, there is also an NR Uu interface between UE 303 and gNB 302. UE 301 and UE 303 has SL connection 311 through PC5 interface. Sidelink 311 and NR access link 312 share a portion or the whole carrier within the same radio frequency band. gNB 302 dynamically allocates resources to UE 301 for NR uplink communications. gNB 302 also dynamically allocates resources to UE 301 for NR sidelink communications. In one embodiment, dynamically allocated radio resource grant is used. In another embodiment, UE 301 autonomously selects a sidelink grant from a pool of resources.

As shown, collision occurs between uplink 312 and sidelink 311 when the UL resource 322 and sidelink resource 321 overlaps in time domain in the shared/same carrier frequency. From time domain perspective, one subframe with 14 OFDM symbols within a sidelink sub-channel is depicted. There are two guard period (GP) symbols and two demodulation reference (DMRS) symbols. In addition, there is a physical sidelink control channel (PSCCH) spanning two OFDM symbols, two PSFCH symbols and one symbol for automatic gain control (AGC) in the first symbol. The rest part is the physical sidelink shared channel (PSSCH) for data transmission. The symbol pattern is one example configured for the 30 kHz subcarrier space (SCS) for sidelink as defined by 3GPP RAN1. UL transmission 322 overlaps with sidelink transmission 321 with two OFDM symbols in time domain. From the timing alignment perspective, the start of uplink transmission has two-symbol offset 331 comparing with the end of the sidelink subframe, i.e., the end of the last GP symbol. The two-symbol offset corresponds to the switching time between sidelink transmission and uplink transmission and time advance (TA) required by uplink transmission. There is one symbol collision between the UL symbol for UL transmission (e.g., for data) and the second PSFCH symbol. Only one of the two symbols (uplink symbol or sidelink symbol) can be transmitted to avoid interference, power split or other related reasons. When a collision happens and one of the PSFCH symbols collides with uplink, and the collided PSFCH symbol is dropped, the other PSFCH symbol needs to be dropped together. The whole PSFCH channel is dropped to avoid decoding error. PSFCH represents the feedback channel at physical layer of sidelink, which carries the ACK or NACK corresponding to the reception of a particular or a number of HARQ transmissions for sidelink between transmitting UE and the receiving UE. PSFCH is sent by the receiving UE over the radio resources indicated by the transmitting UE during its sidelink transmission. The actual content included in PSFCH is dependent on the HARQ feedback option configured. In one novel aspect, transmission prioritization is performed to prioritize the SL-PSFCH and the UL transmission. Other collisions, not shown in the drawing, triggers transmission prioritization, including a collision between sidelink SL-BCH and UL transmission, sidelink synchronization (i.e., sidelink primary synchronization signal and/or secondary synchronization signal) transmission and UL transmission. SL-BCH and sidelink synchronization channels are sidelink common control channels. The UL transmission including UL data transmission and/or UL control channels, such as physical uplink control channel (PUCCH) transmission.

In one novel aspect, the transmitting UE performs transmission prioritization between uplink data transmission and sidelink feedback channel (PSFCH) transmission and/or the other physical channel/signal transmission, such as the SL-BCH and synchronization signal. In some embodiments, the prioritization is for PSFCH and UL channels. In other embodiments, the prioritization is for sidelink physical channels, such as sidelink common control channels and the UL channels.

Figure 4:
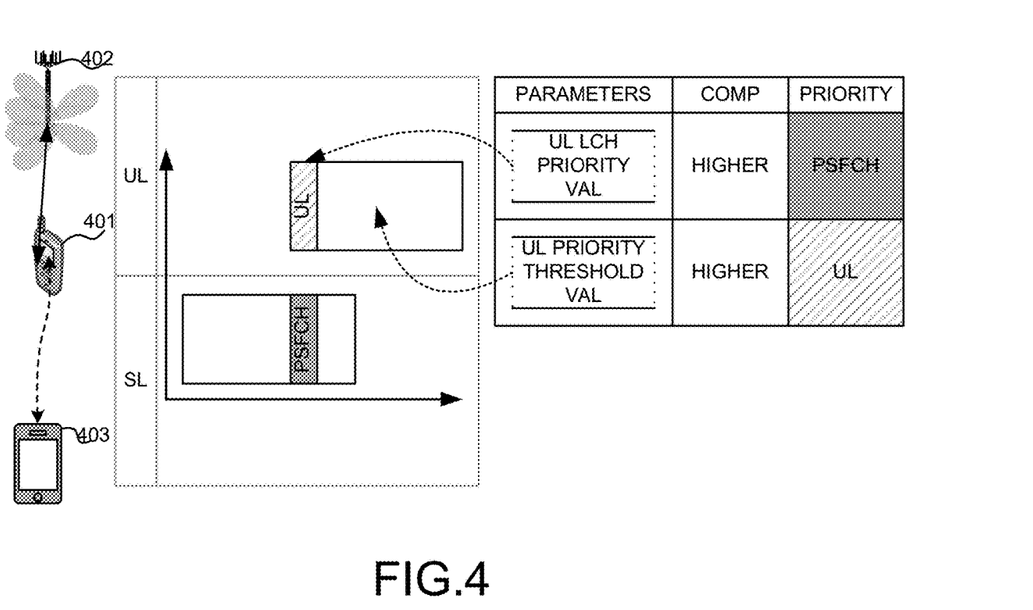
FIG. 4 illustrates exemplary diagrams for transmission prioritization for sidelink PSFCH and UL transmission based on the priority of the logical channel associated with the uplink data in accordance with embodiments of the current invention.

FIG. 4 illustrates exemplary diagrams for transmission prioritization for sidelink PSFCH and UL transmission based on the priority of the logical channel associated with the uplink data in accordance with embodiments of the current invention. UE 401 connects with gNB 402 through access link, including UL and DL. UE 401 establishes sidelink connection with UE 403. SL PSFCH and UL channel overlap in time domain in a shared carrier frequency. In one embodiment, prioritization for sidelink PSFCH and UL transmission is based on the priority of the logical channel associated with the uplink data. When the UL transmission collides with SL PSFCH, the highest priority value of the logic channel with available data for the UL transmission is compared with the configured logic channel priority threshold. If the highest priority value of the logic channel with available data for the UL transmission is higher than the configured value of logic channel priority threshold, the SL PSFCH is prioritized. Otherwise, the UL transmission is prioritized. In other embodiments, the same principle applies to other SL common control channels, including SL-BCH and synchronization signals, such as PSS and SSS. The SL common control channel transmission is prioritized over uplink transmission if the highest priority value of the UL LCH(s) with available data to be transmitted is larger than the configured UL priority threshold. Otherwise, the UL transmission is prioritized.

Figure 5:
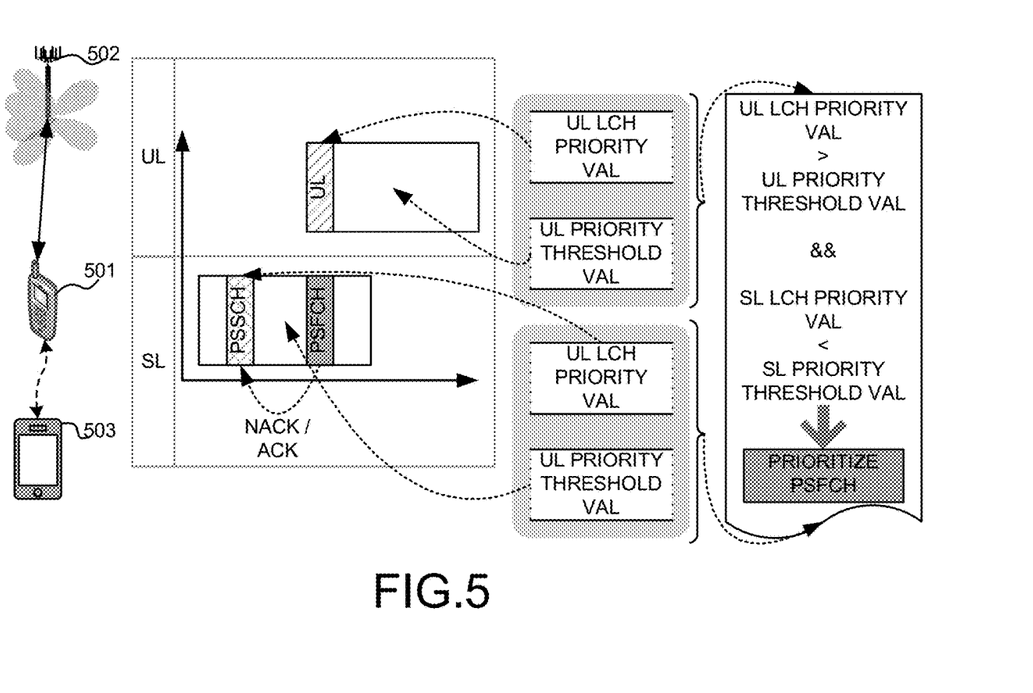
FIG. 5 illustrates exemplary diagrams for transmission prioritization for sidelink PSFCH and UL transmission based on the priority of the logical channel associated with the uplink data and the priority of the logical channel associated with the sidelink data corresponding to the PSFCH in accordance with embodiments of the current invention.

FIG. 5 illustrates exemplary diagrams for transmission prioritization for sidelink PSFCH and UL transmission based on the priority of the logical channel associated with the uplink data and the priority of the logical channel associated with the sidelink data corresponding to the PSFCH in accordance with embodiments of the current invention. UE 501 connects with gNB 502 through access link, including UL and DL. UE 501 establishes sidelink connection with UE 503. SL PSFCH and UL channel overlap in time domain in a shared carrier frequency. PSFCH carries hybrid automatically repeat request (HARQ) ACK/NACK to an SL channel, such as data channel PSSCH. In other embodiments, the sidelink ACK based PSFCH transmission, which means PSFCH only carries ACK, is used. The UE performing data transceiving on the SL channel over the sidelink. In one embodiment, prioritization for sidelink PSFCH and UL transmission is based on the priority of the logical channel associated with the uplink data and the priority of the logical channel associated with the sidelink data corresponding to the PSFCH. In NR V2X separate logic channel priority thresholds are configured for both NR-UL and NR-SL. The sidelink ACK based PSFCH transmission is prioritized if the highest priority value of UL LCH(s) with available data to be transmitted is larger than the configured UL priority threshold and the highest priority value of SL LCH(s) for the sidelink data corresponding to the sidelink ACK is lower than the configured SL priority threshold. Otherwise, the UL transmission is prioritized. The receiving UE reads the priority information within SCI (sidelink control information) to know the priority of the sidelink data. The receiving UE maps the priority information within SCI to the priority value of SL LCH used by MAC layer if the priority information within SCI is not directly corresponding to the priority value of SL LCH used by MAC layer. The priority information within SCI represents the priority of the received SL data. The above mentioned embodiments may also apply to ACK/NACK scenario.

Figure 6:
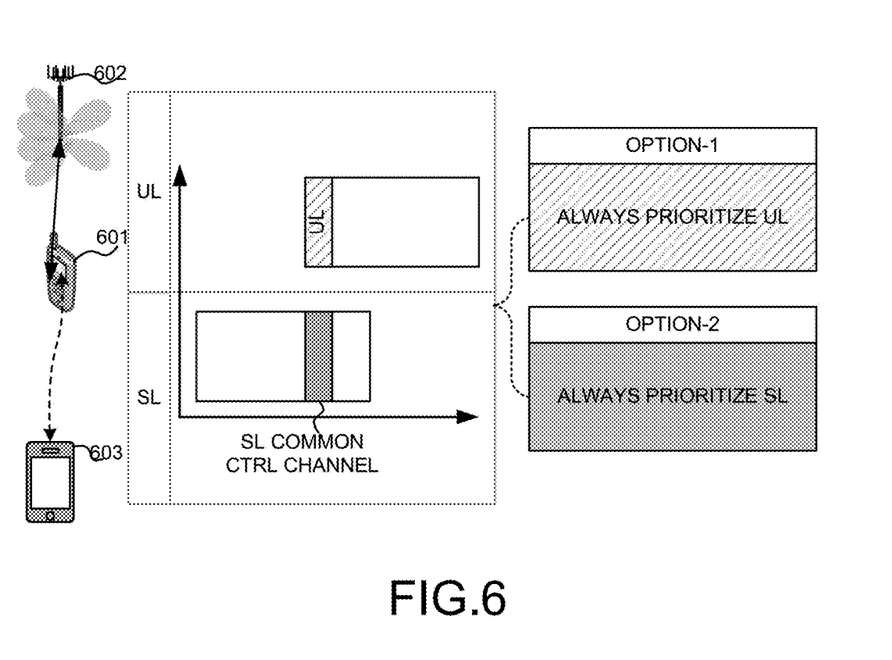
FIG. 6 illustrates exemplary diagrams for transmission prioritization for sidelink common control channel and UL transmission in accordance with embodiments of the current invention.

FIG. 6 illustrates exemplary diagrams for transmission prioritization for sidelink common control channel and UL transmission in accordance with embodiments of the current invention. UE 601 connects with gNB 602 through access link, including UL and DL. UE 601 establishes sidelink connection with UE 603. The UL transmission collides with the SL common control channel, which includes the PSFCH, SL-BCH, and sidelink synchronization channel. In one embodiment, the SL common control channel transmission is always prioritized over the uplink transmission. When the sidelink common control channel is transmitting, the uplink is dropped. In another embodiment, the UL transmission is always prioritized over the SL common control channel transmission. When the UL is transmitting, the SL transmission is dropped.

Figure 7:
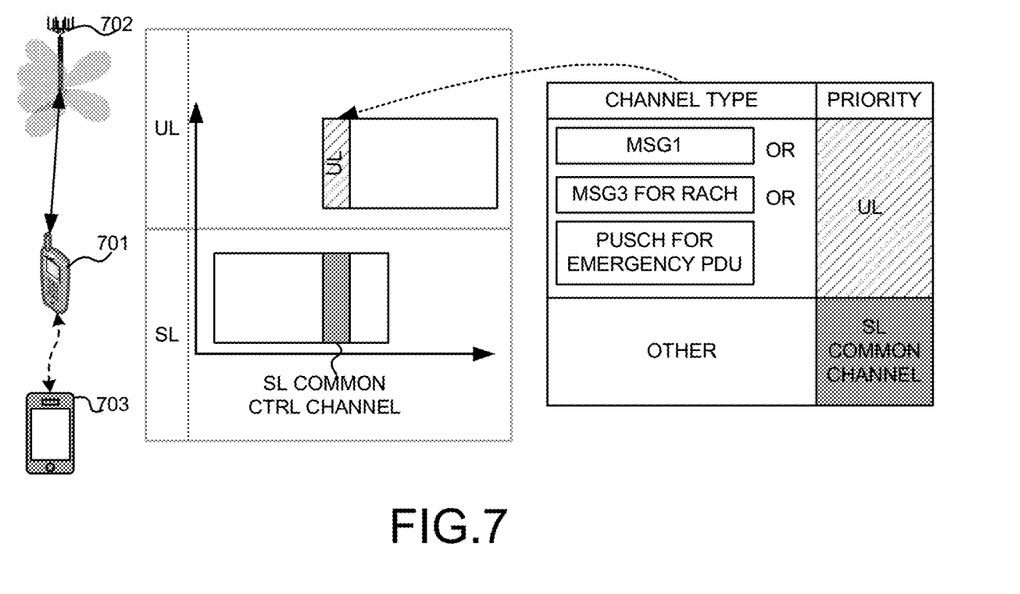
FIG. 7 illustrates exemplary diagrams for transmission prioritization for sidelink common control channel and UL transmission based on UL channel type in accordance with embodiments of the current invention.

FIG. 7 illustrates exemplary diagrams for transmission prioritization for sidelink common control channel and UL transmission based on UL channel type in accordance with embodiments of the current invention. UE 701 connects with gNB 702 through access link, including UL and DL. UE 701 establishes a sidelink connection with UE 703. The UL transmission collides with the SL common control channel, which includes the PSFCH, SL-BCH, and sidelink synchronization channel. In one embodiment, the transmission prioritization is based on the UL transmission type. The SL common control channel transmission is prioritized over uplink transmission if the uplink transmission is not for MSG1 or MSG3 for RACH procedure or PUSCH for emergency PDU connection. The sidelink common control channel is transmitted and the uplink transmission is dropped. Otherwise, the uplink transmission is prioritized. In another embodiment, the UL physical uplink control channel (PUCCH) transmission is always prioritized over the SL transmission. The UL PUCCH is transmitted, and the SL common control channel transmission is dropped.

Figure 8:
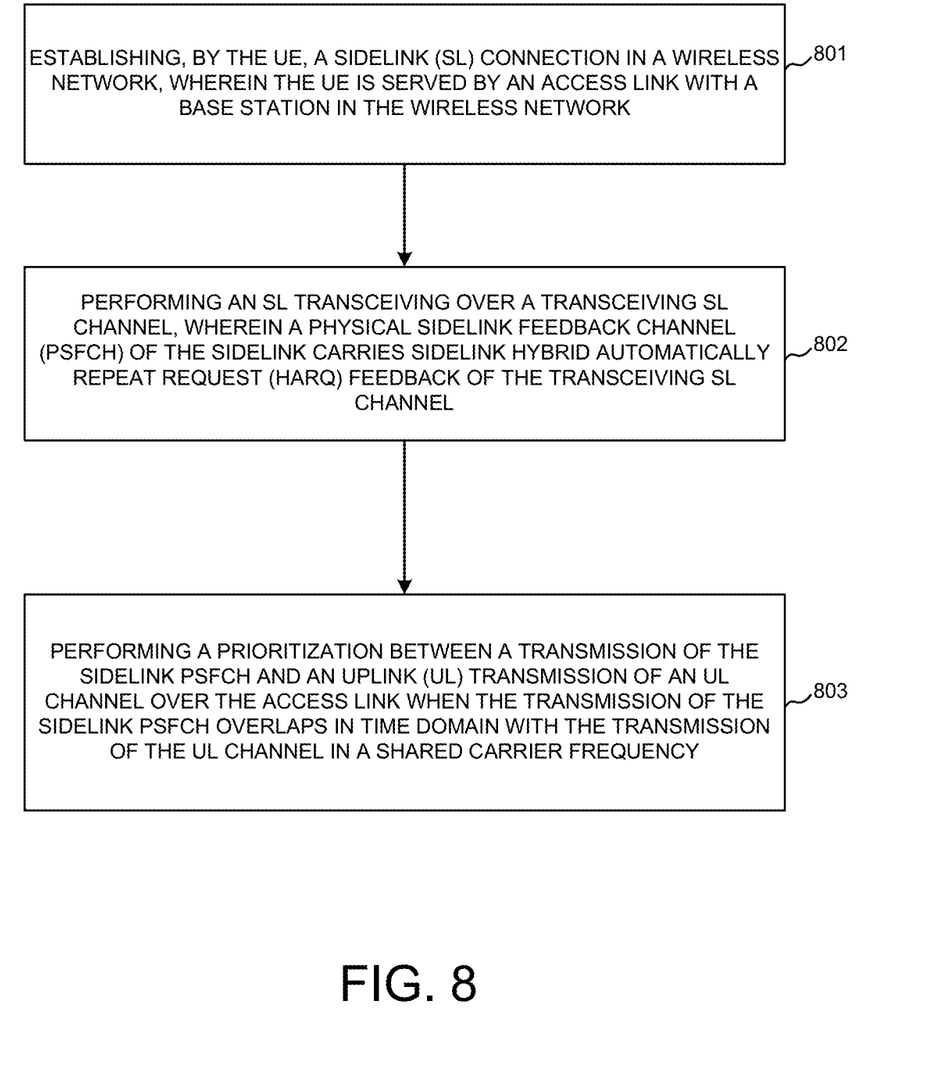
FIG. 8 illustrates an exemplary flow chart for the transmission prioritization between uplink and sidelink PSFCH in accordance with embodiments of the current invention.

FIG. 8 illustrates an exemplary flow chart for the transmission prioritization between uplink and sidelink PSFCH in accordance with embodiments of the current invention. At step 801, the UE establishes a sidelink (SL) connection in a wireless network, wherein the UE is served by an access link with a base station in the wireless network. At step 802, the UE performs an SL transceiving over a transceiving SL channel, wherein a physical sidelink feedback channel (PSFCH) of the sidelink carries sidelink hybrid automatically repeat request (HARQ) feedback of the transceiving SL channel. At step 803, the UE performs a prioritization of a transmission of the sidelink PSFCH and an uplink (UL) transmission of an UL channel over the access link when the transmission of the sidelink PSFCH overlaps in time domain with the transmission of the UL channel in a shared carrier frequency.

Figure 9:
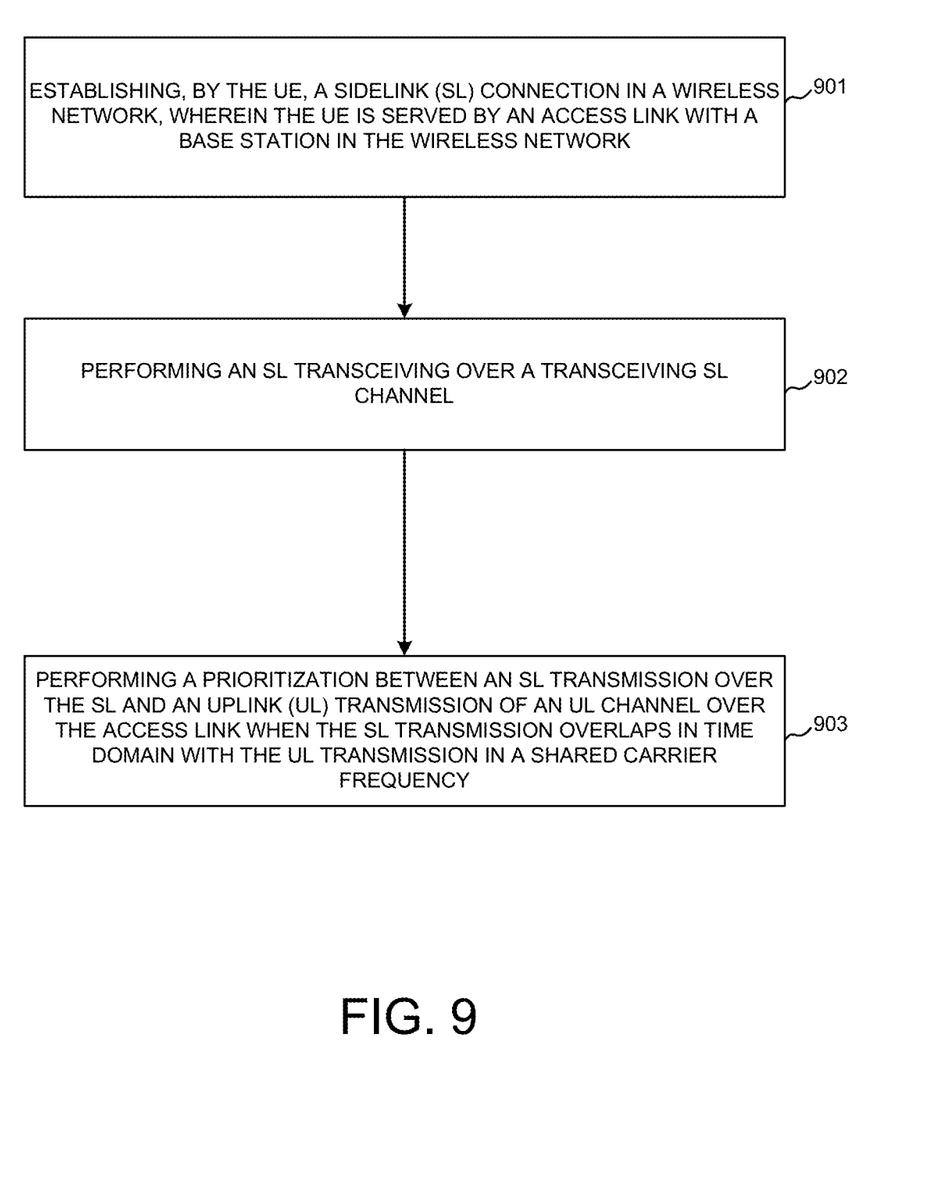
FIG. 9 illustrates an exemplary flow chart for the transmission prioritization between uplink and sidelink common control channel in accordance with embodiments of the current invention.

FIG. 9 illustrates an exemplary flow chart for the transmission prioritization between uplink and sidelink common control channel in accordance with embodiments of the current invention. At step 901, the UE establishes a sidelink (SL) connection in a wireless network, wherein the UE is served by an access link with a base station in the wireless network. At step 902, the UE performs an SL transceiving over a transceiving SL channel. At step 903, the UE performs a prioritization of an SL transmission over the SL and an uplink (UL) transmission of an UL channel over the access link when the SL transmission overlaps in time domain with the UL transmission in a shared carrier frequency.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE), comprising:
    establishing, by the UE, a sidelink (SL) connection in a wireless network, wherein the UE is served by an access link with a base station in the wireless network;
    performing an SL transceiving over a transceiving SL channel, wherein a physical sidelink feedback channel (PSFCH) of the sidelink carries sidelink hybrid automatically repeat request (HARQ) feedback of the transceiving SL channel; and
    performing a prioritization between a transmission of the sidelink PSFCH and an uplink (UL) transmission of an UL channel over the access link when the transmission of the sidelink PSFCH overlaps in time domain with the transmission of the UL channel in a shared carrier frequency, wherein the transmission of the PSFCH is an ACK/NACK or ACK based SL transmission, and wherein the transmission of the PSFCH of the corresponding SL transmission is prioritized over the transmission of the UL channel when a channel priority value of the UL channel is larger than a configured UL priority threshold and a channel priority value of the SL transmission for the transceiving SL channel is lower than a configured SL priority threshold, otherwise, the UL transmission is prioritized.

2. The method of claim 1, wherein the transceiving SL channel is an SL data channel or an SL control channel.

3. The method of claim 1, wherein the PSFCH transmission is prioritized over the UL transmission when a highest logic channel priority value of the UL transmission with available data is larger than a configured UL priority threshold, otherwise, the UL transmission is prioritized.

4. A user equipment (UE), comprising:
- a transceiver that transmits and receives radio frequency (RF) signal in a wireless network;
- a sidelink (SL) connection manager that establishes an SL connection in the wireless network, wherein the UE is served by an access link with a base station in the wireless network;
- an SL channel handler that performs an SL transceiving over a transceiving SL channel, wherein a physical sidelink feedback channel (PSFCH) of the sidelink carries sidelink hybrid automatically repeat request (HARQ) feedback of the transceiving SL channel; and
- a prioritization manager that performs a prioritization between an SL transmission of an SL channel over the SL and an uplink (UL) transmission of an UL channel over the access link when the SL transmission overlaps in time domain with the transmission of the UL transmission in a shared carrier frequency, wherein the transmission of the PSFCH is an ACK/NACK or ACK based SL transmission, and wherein the transmission of the PSFCH of the corresponding SL transmission is prioritized over the transmission of the UL channel when a channel priority value of the UL channel is larger than a configured UL priority threshold and a channel priority value of the SL transmission for the transceiving SL channel is lower than a configured SL priority threshold, otherwise, the UL transmission is prioritized.

5. The UE of claim 4, wherein the SL channel is the PSFCH.

6. The UE of claim 5, wherein the SL transmission of the PSFCH is prioritized over the UL transmission when a highest logic channel priority value of the UL transmission with available data is larger than a configured UL priority threshold, otherwise, the UL transmission is prioritized.

7. The UE of claim 4, wherein the SL channel is an SL common control channel.

8. The UE of claim 7, wherein the SL transmission of the SL common control channel is prioritized over the UL transmission.

9. The UE of claim 7, wherein the UL transmission is prioritized over the SL transmission of the SL common control channel when the UL transmission is one of transmissions comprising a MSG1 transmission, a MSG3 for random access channel (RACH) procedure, and a physical uplink shared channel (PUSCH) for emergency packet data unit (PDU) connection, otherwise, the SL common control channel transmission is prioritized over the UL transmission.

* * * * *